(12) United States Patent
Zhou et al.

(10) Patent No.: US 12,305,261 B2
(45) Date of Patent: May 20, 2025

(54) Ni-BASED SUPERALLOY POWDER FOR ADDITIVE MANUFACTURING AND AN ARTICLE MADE THEREFROM

(71) Applicant: CRS HOLDINGS, LLC, Wilmington, DE (US)

(72) Inventors: Ning Zhou, Sinking Spring, PA (US); Kyle B. Stritch, Wyomissing, PA (US); Tao Wang, Reading, PA (US); Stephane A. J. Forsik, Reading, PA (US); Gian A. Colombo, Shillington, PA (US); Samuel J. Kernion, Lancaster, PA (US); Mario E. Epler, Denver, PA (US); Austin Dicus, East Earl, PA (US)

(73) Assignee: CRS HOLDINGS, LLC, Wilmington, DE (US)

( * ) Notice: Subject to any disclaimer, the term of this patent is extended or adjusted under 35 U.S.C. 154(b) by 226 days.

(21) Appl. No.: 17/663,736

(22) Filed: May 17, 2022

(65) Prior Publication Data

US 2022/0349032 A1    Nov. 3, 2022

Related U.S. Application Data

(63) Continuation of application No. 16/750,745, filed on Jan. 23, 2020, now abandoned.

(60) Provisional application No. 62/795,618, filed on Jan. 23, 2019.

(51) Int. Cl.
| | |
|---|---|
| *C22C 19/05* | (2006.01) |
| *B22F 10/38* | (2021.01) |
| *B22F 10/64* | (2021.01) |
| *B33Y 70/00* | (2020.01) |
| *C22C 1/04* | (2023.01) |
| *B22F 10/28* | (2021.01) |
| *B22F 10/36* | (2021.01) |
| *B22F 10/366* | (2021.01) |

(52) U.S. Cl.
CPC ............ *C22C 1/0433* (2013.01); *B22F 10/38* (2021.01); *B22F 10/64* (2021.01); *B33Y 70/00* (2014.12); *C22C 19/057* (2013.01); *B22F 10/28* (2021.01); *B22F 10/36* (2021.01); *B22F 10/366* (2021.01)

(58) Field of Classification Search
CPC ........ C22C 19/057; C22C 19/056; C22F 1/10
See application file for complete search history.

(56) References Cited

U.S. PATENT DOCUMENTS

| | | | |
|---|---|---|---|
| 3,793,012 A | 2/1974 | Walter et al. | |
| 3,944,416 A | 3/1976 | Walter | |
| 4,116,723 A | 9/1978 | Gell et al. | |
| 4,174,964 A | 11/1979 | Shaw et al. | |
| 4,209,348 A | 6/1980 | Duhl et al. | |
| 4,459,160 A * | 7/1984 | Meetham | C30B 29/52 148/404 |
| 4,589,937 A | 5/1986 | Jackson et al. | |
| 4,888,069 A | 12/1989 | Duhl et al. | |
| 4,908,183 A | 3/1990 | Chin et al. | |
| 4,981,644 A | 1/1991 | Chang | |
| 5,151,249 A | 9/1992 | Austin et al. | |
| 5,207,846 A | 5/1993 | Kelly | |
| 5,240,491 A | 8/1993 | Budinger et al. | |
| 5,240,518 A | 8/1993 | Wortman et al. | |
| 5,611,670 A * | 3/1997 | Yoshinari | C22C 19/056 164/122.2 |
| 6,051,083 A | 4/2000 | Tamaki et al. | |
| 6,054,096 A | 4/2000 | Duhl et al. | |
| 6,355,117 B1 | 3/2002 | DeLuca et al. | |
| 6,478,897 B1 | 11/2002 | Izumida et al. | |
| 8,900,512 B2 | 12/2014 | Harada et al. | |
| 9,352,421 B2 | 5/2016 | Illston | |
| 9,816,161 B2 | 11/2017 | Kawagishi et al. | |
| 2006/0057018 A1 | 3/2006 | Hobbs et al. | |
| 2009/0185944 A1 | 7/2009 | Hu | |
| 2011/0143164 A1 | 6/2011 | Cetel et al. | |
| 2011/0256421 A1 | 10/2011 | Bose et al. | |

(Continued)

FOREIGN PATENT DOCUMENTS

| | | |
|---|---|---|
| EP | 0208645 A2 | 1/1987 |
| EP | 0225837 A2 | 6/1987 |

(Continued)

OTHER PUBLICATIONS

B.A. Cowles et al., "Cyclic Behavior of Turbine Disk Alloys at 650C," ASME Trans., vol. 102, Oct. 1980, pp. 356-363.

(Continued)

*Primary Examiner* — Jessee R Roe
(74) *Attorney, Agent, or Firm* — Niels Haun; Dann, Dorfman, Herrell & Skillman, P.C.

(57) ABSTRACT

A nickel base superalloy powder for additive manufacturing applications is disclosed. The alloy powder has the following broad weight percent composition:

| | |
|---|---|
| C | 0-0.1 |
| Mn | 0.5 max. |
| Si | 0-0.03 |
| Cr | 4-16 |
| Fe | 0-1.5 |
| Mo | 0-6 |
| W | 0-8 |
| Co | 0-15 |
| Ti | 0-2 |
| Al | 0.5-5.5 |
| Nb | 0-6 |
| Ta | 7.5-14.5 |
| Hf | 0-2.0 |
| Zr | 0-0.1 |
| Re | 0-6 |
| Ru | 0-3 |
| B | 0-0.03 |

The balance of the alloy is at least 50% nickel and the usual impurities. An article of manufacture made from the alloy is also disclosed.

10 Claims, 13 Drawing Sheets

(56) References Cited

U.S. PATENT DOCUMENTS

| | | |
|---|---|---|
| 2014/0119979 A1 | 5/2014 | Zhang et al. |
| 2016/0348216 A1 | 12/2016 | Szuromi et al. |
| 2018/0066340 A1 | 3/2018 | Reed et al. |
| 2018/0073106 A1 | 3/2018 | Hardy et al. |
| 2018/0195156 A1 | 7/2018 | Reed et al. |
| 2018/0216212 A1 | 8/2018 | Reed et al. |
| 2018/0223395 A1 | 8/2018 | Mourer et al. |
| 2018/0347014 A1 | 12/2018 | Szuromi et al. |

FOREIGN PATENT DOCUMENTS

| | | |
|---|---|---|
| EP | 0240451 A2 | 10/1987 |
| EP | 1586669 A1 | 10/2005 |
| EP | 3034639 A1 | 6/2016 |
| EP | 3257956 A1 | 12/2017 |
| JP | 2017222929 A | 12/2017 |

OTHER PUBLICATIONS

R. Vilar et al., "Repair and manufacturing of single crystal Ni-based superalloys components by laser powder deposition—A review," J.Laser Appl., vol. 27, No. S1, Feb. 2015, pp. S17004-1 to S17004-7.

A.F. Giamei, "Development of Single Crystal Superalloys: A Brief History," Advanced Materials & Processes, vol. 171, No. 9, Sep. 1, 2013, pp. 26-30.

European Patent Office, International Search Report, PCT/US2020/014781, May 15, 2020, 5 pages.

\* cited by examiner

Ni-BASED SUPERALLOY POWDER FOR ADDITIVE MANUFACTURING AND AN ARTICLE MADE THEREFROM

CROSS REFERENCE TO RELATED APPLICATIONS

This application is a continuation of U.S. patent application Ser. No. 16/750,745, filed Jan. 23, 2020, which claims the benefit of U.S. Provisional Patent Application No. 62/795,618, filed Jan. 23, 2019, the entireties of which are incorporated herein by reference.

BACKGROUND OF THE INVENTION

Field of the Invention

This invention relates generally to Ni-based superalloys and in particular to a Ni-based superalloy powder that is useful in an additive manufacturing process for making articles therefrom.

Description of the Related Art

With the advent of additive manufacturing technologies, manufacturers of turbomachinery (high temperature gas turbines and jet engines are looking at leveraging the design flexibility offered by the additive manufacturing process to directly produce parts with complex features for use in the hot gas path of gas turbines and jet engines. A powder bed fusion technique using selective laser melting is one of the most promising additive manufacturing techniques. Compared with the known electron beam powder bed process, selective laser melting with powder bed does not require pre-sintering. Consequently, designers can incorporate complex internal features in the parts without worrying about removing sintered powder trapped inside hollows of the part after printing. Laser systems also offer finer resolution for printing intricate features.

The drawback of laser melting system is the large temperature gradient that occurs in a part during solidification. The very large temperature gradient leads to cracking of the alloy, especially for superalloys having a high volume fraction of the gamma prime (γ') phase that provides superior strength and creep resistance such as CM247LC and Rene142.

For selective laser melting process, cracking occurs either during build or post-build heat treatment. Efforts have been made by the superalloy research community to mitigate the cracking problem, but have focused primarily on adjusting laser parameters such as power and scanning speed. There have been few attempts to modify the chemistries of the known superalloys, such as described in US20180347014A1, because of the reluctance to deviate from the known and accepted alloy chemistry specifications.

SUMMARY OF THE INVENTION

The problems associated with the known superalloys as discussed above are resolved to a large degree by an alloy powder having the following broad and intermediate weight percent ranges.

| Element | Broad | Intermediate |
| --- | --- | --- |
| C | 0-0.1 | 0-0.1 |
| Mn | 0.5 max. | 0.5 max. |
| Si | 0-0.03 | 0-0.03 |
| Cr | 4-16 | 4-11 |
| Fe | 0-1.5 | 0-1 |
| Mo | 0-6 | 0-5 |
| W | 0-8 | 0.5-8 |
| Co | 0-15 | 0-10 |
| Ti | 0-2 | 0-1 |
| Al | 0.5-5.5 | 3-5 |
| Nb | 0-6 | 0-5 |
| Ta | 7.5-14.5 | 7.5-11.5 |
| Hf | 0-2.0 | 0-1.5 |
| Zr | 0-0.1 | 0-0.1 |
| Re | 0-6 | 0-5 |
| Ru | 0-3 | 0-3 |
| B | 0-0.03 | 0-0.03 |

The balance of the alloy is at least about 50% nickel and the usual impurities found in commercial grades of Ni-base superalloys intended for the same use and service. The alloy is further characterized by the following relationships among the constituent elements of the alloy:

$$\% \text{Al} + \% \text{Ti} \leq 6;$$

$$\% \text{W} + \% \text{Mo} + \% \text{Ru} + \% \text{Re} < 10; \text{ and}$$

$$\% \text{C} + \% \text{B} + \% \text{Si} + \% \text{Zr} < 0.15.$$

In accordance with another aspect of the present invention, the Ni-base superalloy powder may be embodied with any of the following preferred alloy weight percent compositions.

| Element | Preferred A | Preferred B | Preferred C | Preferred D | Preferred E |
| --- | --- | --- | --- | --- | --- |
| C | 0-0.1 | 0-0.1 | 0-0.1 | 0-0.1 | 0-0.1 |
| Mn | 0.5 max. | 0.5 max. | 0.5 max. | 0.5 max. | 0.5 max. |
| Si | 0-0.03 | 0-0.03 | 0-0.03 | 0-0.03 | 0-0.03 |
| Cr | 9-11 | 9-11 | 4-8 | 9-11 | 8-10 |
| Fe | 1 max. | 1 max. | 1 max. | 1 max. | 1 max |
| Mo | 2-5 | 2-5 | 0.5-1.5 | 2-5 | 2-5 |
| W | 0.5-2 | 0.5-2 | 6-8 | 3.5-4.5 | 4-6 |
| Co | 4-6 | 0.5-2 | 0-1 | 0.5-2 | 9-11 |
| Ti | 0-0.5 | 0-0.5 | 0-1 | 0-0.5 | 0-0.5 |
| Al | 3-5 | 3-5 | 3-5 | 3-5 | 4-5.5 |
| Nb | 3-5 | 2.5-4 | 0-1 | 2.5-4 | 0-1 |
| Ta | 7.5-9.5 | 8.5-10.5 | 8.5-10.5 | 8.5-10.5 | 9.5-11.5 |
| Hf | 0-0.5 | 0-0.5 | 0.5-1.5 | 0-0.5 | 0-0.5 |
| Zr | 0-0.1 | 0-0.1 | 0-0.1 | 0-0.1 | 0-0.1 |
| Re | 0-1 | 0-1 | 0-1 | 0-1 | 0-1 |

-continued

| Element | Preferred A | Preferred B | Preferred C | Preferred D | Preferred E |
|---------|-------------|-------------|-------------|-------------|-------------|
| Ru | 0-1 | 0-1 | 0-1 | 0-1 | 0-1 |
| B | 0-0.03 | 0-0.03 | 0-0.03 | 0-0.03 | 0-0.03 |

The balance of the alloy is at least about 50% nickel and the usual impurities found in commercial grades of Ni-base superalloys intended for the same use and service. The alloy is further characterized by the following relationships among the constituent elements of the alloy:

% Al+% Ti≤6;

% W+% Mo+% Ru+% Re<10; and

% C+% B+% Si+% Zr<0.1.

The foregoing tabulations are provided as a convenient summary and are not intended to restrict the lower and upper values of the ranges of the individual elements for use in combination with each other, or to restrict the ranges of the elements for use solely in combination with each other. Thus, one or more of the ranges can be used with one or more of the other ranges for the remaining elements. In addition, a minimum or maximum for an element of one range can be used with the minimum or maximum for the same element in another range, and vice versa. Moreover, the alloy according to the present invention may comprise, consist essentially of, or consist of the constituent elements described above and throughout this application.

The alloy according to the present invention is designed to address the following problems: the transformation strain associated with the precipitation of $\gamma'$ during cooling and the internal stress buildup that occurs during aging heat treatment. Those phenomena combined with the fast $\gamma'$ precipitation kinetics and the residual stress inherent in the additive manufacturing process make the known alloys prone to strain-age cracking defects. It is an objective of the present invention to modify the known alloy chemistry and thereby, to tune the lattice misfit and precipitation kinetics to provide a new alloy that is optimized for the selective laser additive manufacturing process and which is strain-age cracking resistant while retaining a high $\gamma'$ volume fraction for superior elevated temperature strength and creep resistance.

In accordance with another aspect of the present invention there is provided an article made from consolidated powder produced with any of the alloys described above. The article is characterized by having more than about 35 volume percent (vol. %) of the $\gamma'$ phase in gamma ($\gamma$) phase matrix when the article is in the age hardened condition. The article is further characterized by a lattice misfit parameter ($\delta$) that is greater than about −0.1% and preferably about −0.05% to about +0.6% where the lattice misfit parameter is defined as:

$$\delta = \frac{2 \times (\alpha_{\gamma'} - \alpha_\gamma)}{\alpha_{\gamma'} + \alpha_\gamma}$$

The parameter $\alpha_{\gamma'}$ is the lattice constant for the $\gamma'$ precipitate and parameter $\alpha_\gamma$ is the lattice constant for the $\gamma$ matrix material.

Here and throughout this specification the term "percent" or the symbol "%" means percent by weight or mass percent, unless otherwise specified. The term "high $\gamma'$ volume fraction" means at least 35% by volume (volume % or vol. %) of the $\gamma'$ phase in gamma ($\gamma$) phase matrix of the alloy when in the age hardened condition. The term "high strength" means a yield strength higher than that provided by Alloy 718 when produced with an additive manufacturing process tested at a temperature beyond 1500° F. (816° C.). The term "high creep resistance" means a creep strength higher than that provided by Alloy 718 produced with an additive manufacturing process tested at a temperature beyond 1500° F. (816° C.). The term "aging" is used synonymously with "age hardening" and "precipitation hardening". Moreover, the term "solvus" means the solvus temperature as that term is generally understood.

BRIEF DESCRIPTION OF THE DRAWINGS

The working examples described in the following detailed description of the invention will be better understood when read with reference to the drawings wherein.

DETAILED DESCRIPTION

Figure 1A:
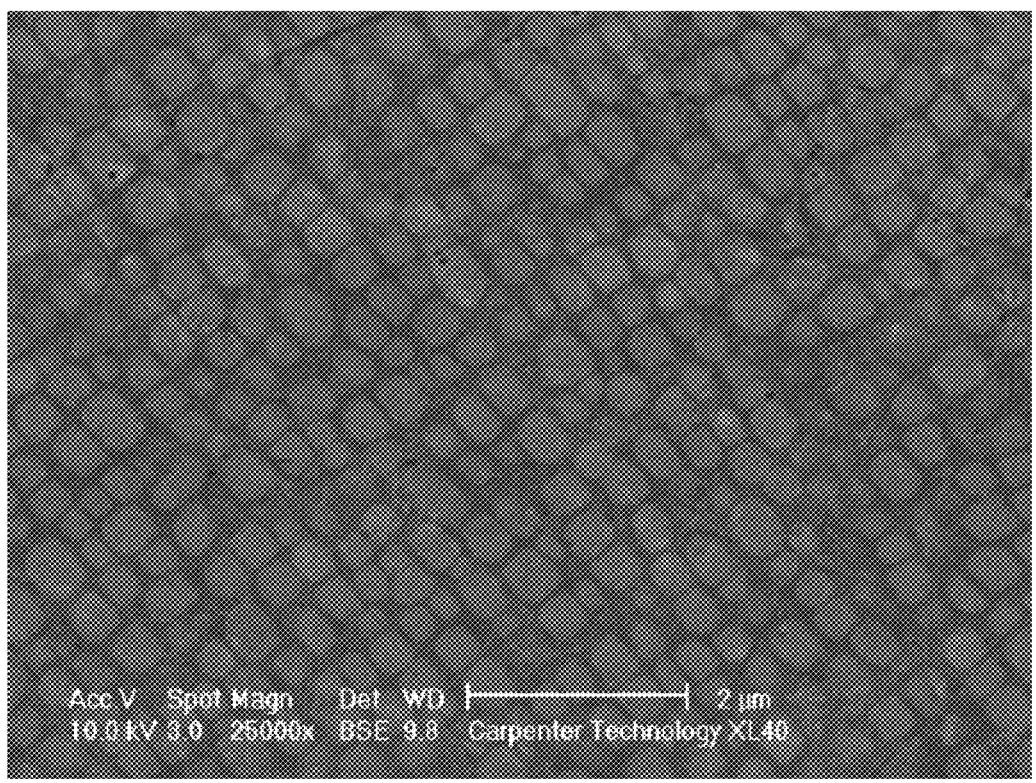
FIG. 1A is a backscatter SEM image of an aged sample of Example 1 of the alloy according to the present invention.

The alloy of this invention contains at least about 0.5% and preferably at least about 3% aluminum to combine with available nickel to form the γ' phase, $Ni_3(Al,Ti)$, during cooling after laser melting and during subsequent aging of the alloy in consolidated form. The alloy contains not more than about 5.5% and preferably not more than about 5% aluminum in order to benefit the weldability of the alloy. Up to about 2% titanium can be substituted for some of the aluminum for similar reasons. Preferably, the alloy contains not more than about 1% and for some applications not more than about 0.5% titanium. The combined amount of Ti and Al should not be more than about 6%. Preferably, the alloy may contain about 3% to 6% and better yet, about 3.5% to 5% of aluminum and titanium combined (Al+Ti).

This alloy also contains at least about 7.5% tantalum. However, in a preferred embodiment the alloy may contain at least about 8.5% tantalum. Tantalum also combines with nickel to form the γ' phase during cooling after laser melting and during subsequent aging of the alloy in consolidated form. Too much tantalum can lead to the formation of undesirable phases such as eta phase and delta phase. Therefore, tantalum is restricted to not more than about 10.5% and preferably to not more than about 9.5%. In a different embodiment, the alloy contains about 9.5% to about 11.5% tantalum. Up to about 6% niobium and up to about 2.0% hafnium may be present in this alloy in substitution for some of the tantalum for the same purpose. Tantalum, and niobium and hafnium when present, ensure that a sufficient volume of the γ' phase is formed during the aging heat treatment of the additively manufactured product.

The alloy may optionally contain up to about 6% molybdenum, up to about 8% tungsten, up to about 6% rhenium, and up to about 3% ruthenium. Those elements tend to partition to the matrix material and their concentrations are controlled to shift the lattice misfit parameter toward a more positive value. A more positive lattice misfit parameter is believed to mitigate strain-age cracking that could otherwise occur in the alloy during solidification and subsequent aging heat treatment. When present, molybdenum is preferably limited to not more than about 5%, rhenium is limited to not more than about 5%, ruthenium is limited to not more than about 1%. For certain applications molybdenum is limited to not more than about 1.5%, tungsten is limited to not more than about 2%, and rhenium is limited to not more than about 1%. When present in this alloy, the combined amounts of molybdenum, tungsten, rhenium, and ruthenium are controlled such that % Mo+% W+% Re+% Ru is less than 12%, preferably about 2% to about 12%, and better yet about 3% to about 10%.

This alloy may contain up to about 15% cobalt or up to about 11% cobalt. Cobalt lowers the stacking fault energy in the crystal lattice and benefits the creep resistance property provided by the alloy. Cobalt also contributes to the corrosion resistance provided by the alloy. Toward those ends, a preferred embodiment of the alloy contains at least about 0.5% cobalt. A second preferred embodiment contains at least about 4% cobalt. A further embodiment contains at least about 9% cobalt. Too much cobalt can result in the precipitation of undesired phases such as sigma phase (Co—Cr). Therefore, the alloy preferably contains not more than about 10% cobalt. In one preferred embodiment the alloy contains not more than about 6% cobalt. In another preferred embodiment the alloy contains not more than about 2% cobalt. In a further embodiment, the alloy contains not more than about 1% cobalt.

The elements carbon, silicon, zirconium, and boron may be present in this alloy. However, those elements tend to depress the solidus temperature of the alloy and can segregate to the grain boundaries of the alloy matrix. In order to avoid or limit cracking on solidification, a narrow solidification temperature range is preferred. For these reasons in the present alloy carbon is restricted to not more than about 0.1%, silicon is restricted to not more than about 0.03%, zirconium is limited to not more than about 0.1%, and boron is limited to not more than about 0.03%. In the alloy of this invention, the combined amount of the elements C, Si, Zr, and B is not more than about 0.15% and preferably, not more than about 0.1%.

Up to about 1.5% iron may be present in the alloy of this invention. However, too much iron adversely affects the microstructural stability of the alloy and can combine with other elements to form undesired secondary phases such as sigma phase (Fe—Cr) and laves phase (e.g., $Fe_2Nb$, $Fe_2Ti$, and $Fe_2Mo$). Therefore, the amount of iron is preferably restricted to not more than about 1.0%. Although it is not intentionally added, up to about 0.5% manganese may be present in this alloy as a residual from alloying additions during melting.

The balance of the alloy is at least about 50% nickel. Preferably, the alloy contains about 50-75% nickel. The balance may also include minor amounts of inevitable impurity elements, such as phosphorus, sulfur, oxygen, and nitrogen, for example, not more than about 0.03% phosphorus and not more than about 0.01% each of sulfur oxygen and nitrogen.

The alloy according to this invention is preferably provided in powder form. Toward that end the alloy is vacuum induction melted and then atomized to form fine powder. The resulting powder is then screened to appropriate size for the additive manufacturing process. Useful articles are prepared using any known technique for metal powder consolidation, for example, selective laser powder bed fusion. After the article is fully formed, it is preferably processed using different combinations and variations of hot isostatic pressing (HIP), solution heat treatment, quenching, and age hardening to develop the desired microstructure and properties. Useful articles such as gas turbine components (e.g., turbine blades) can also be made by direct casting of the alloy using such casting techniques as directional solidification, equiaxed grain casting, and single crystal investment casting.

Working Examples

In order to demonstrate the desirable combination of properties provided by the alloy of this invention, a set of comparative examples were melted, processed, and tested. Set forth in Table 1 below are the weight percent compositions of four heats that were melted and tested.

TABLE 1

|  | Al | Co | Cr | Hf | Mo | Nb | Ta | Ti | W | Ni |
|---|---|---|---|---|---|---|---|---|---|---|
| Example 1 | 4.05 | 5.01 | 9.79 | 0 | 2.96 | 3.86 | 7.93 | 0 | 0.86 | Bal[1] |
| Example 2 | 4.09 | 1.62 | 9.78 | 0 | 2.96 | 3.07 | 9.36 | 0 | 0.75 | Bal[1] |
| Example 3 | 3.95 | 0.11 | 5.8 | 1.18 | 0.99 | 0 | 9.37 | 0.52 | 7.37 | Bal[1] |
| CM247LC[2] | 5.6 | 9.27 | 8.2 | 1.39 | 0.6 |  | 3.29 | 0.64 | 9.21 | 61.65 |

[1]Balance includes usual impurity elements.
[2]Also includes 0.03% Zr, 0.014% B, and 0.082% C.

Examples 1, 2, and 3 were melted under vacuum and cast into ingots which were given a homogenization heat treatment after solidification. Examples 1 and 2 were solution heat treated at 2250° F. (1232° C.) for one hour and quenched in water. Example 3 was gas quenched from the homogenization temperature in a chamber backfilled with 10 bar of nitrogen. The CM247LC example was melted under vacuum, homogenized after solidification, solution treated at 2250° F. (1232° C.) for one hour and quenched in water. After quenching, specimens of each alloy were aged at 1975° F. (1079° C.) for 4 hours followed by air cooling. The specimens were then heat treated with a second aging at 1600° F. (871° C.) for 20 hours and then air cooled.

Figure 1B:
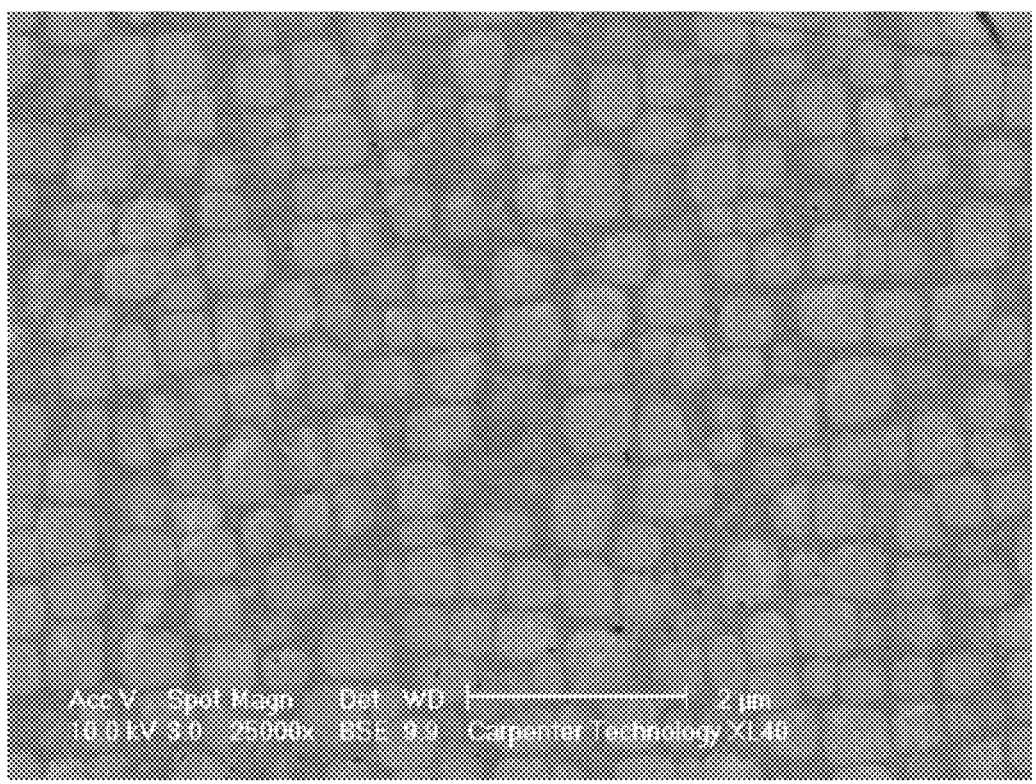
FIG. 1B is a backscatter SEM image of an aged sample of Example 2 of the alloy according to the present invention.
Figure 1C:
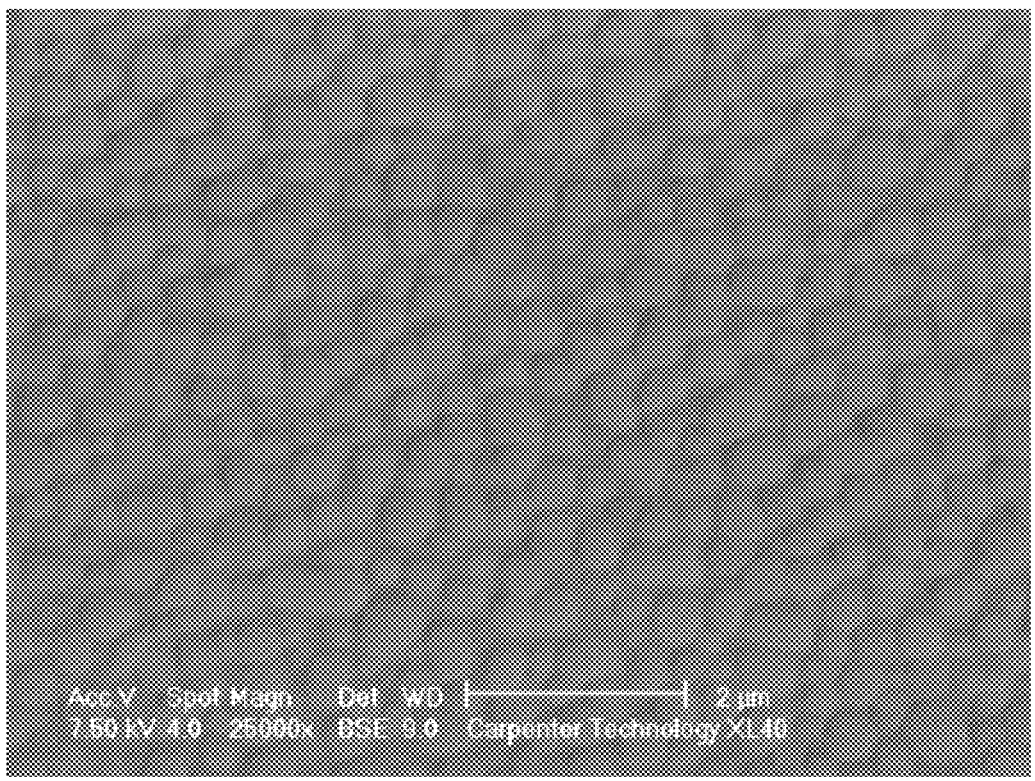
FIG. 1C is a backscatter SEM image of an aged sample of Example 3 of the alloy according to the present invention.
Figure 1D:
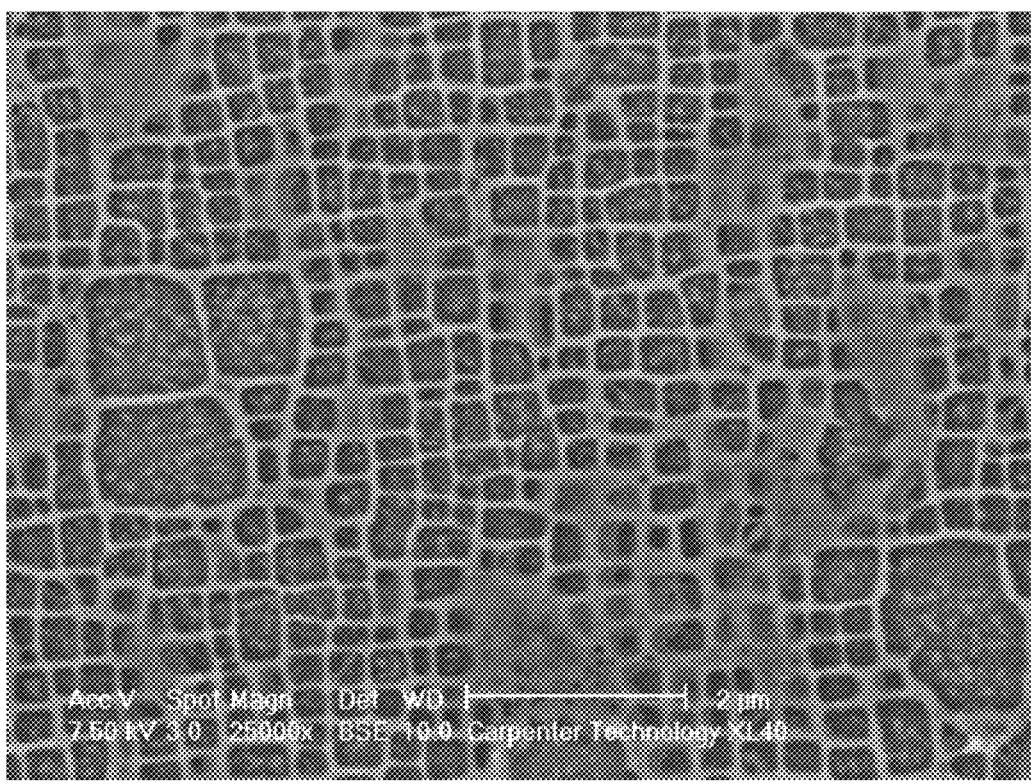
FIG. 1D is a backscatter SEM image of an aged sample of the CM247LC alloy.

The microstructures of Examples 1-3 after aging are shown in FIGS. 1A-1C, respectively. The microstructure of an aged specimen of the CM247LC example is shown in FIG. 1D for comparison. The volume percent of γ' in Examples 1-3 after aging is about 60 vol. % based on image analysis. The volume fraction of γ' in Example 3 after aging is slightly higher than that of γ' in Examples 1 and 2. The equivalent diameter of the γ' precipitates in all 3 examples after ageing is about 300 to 500 nm.

The lattice misfit parameters (δ) of Examples 1-3 and CM247LC were calculated using the THERMO-CALC software for a temperature of 1600° F. (871° C.). Actual lattice misfit parameters for Examples 1-3 and CM247LC were measured by x-ray diffraction (XRD). The calculated and measured values of δ for each example are shown in Table 2 below.

TABLE 2

| Example | Calculated Lattice Misfit | Measured Misfit |
|---|---|---|
| 1 | 0.09 | 0.209 |
| 2 | −0.02 | 0.055 |
| 3 | 0.33 | 0.294 |
| CM247LC | −0.152 | −0.035 |

Figure 2:
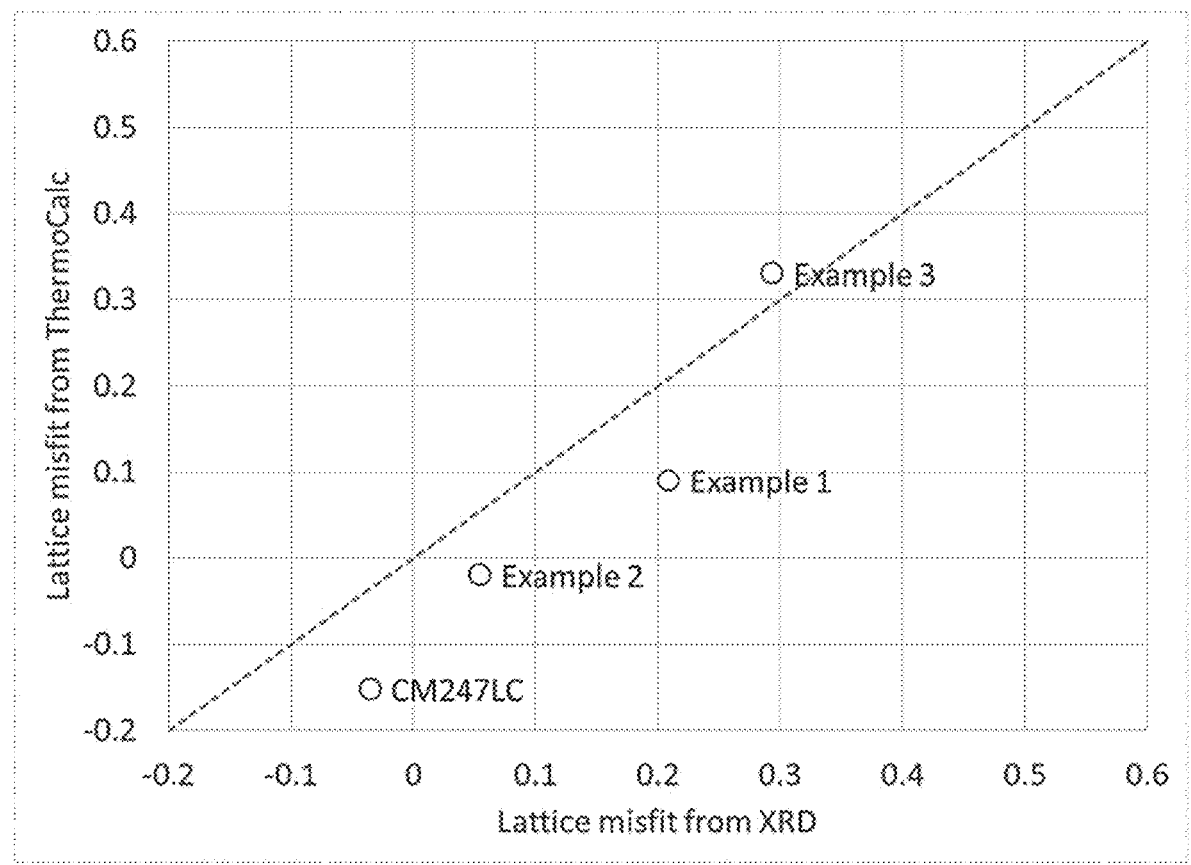
FIG. 2 shows a graph of the calculated misfit parameter compared to actual measured values of the misfit parameter for Examples 1-3 and the CM247L alloy.

The results presented in Table 2 are graphed in FIG. 2 to show the good correlation between the actual and calculated values.

Figure 3A:
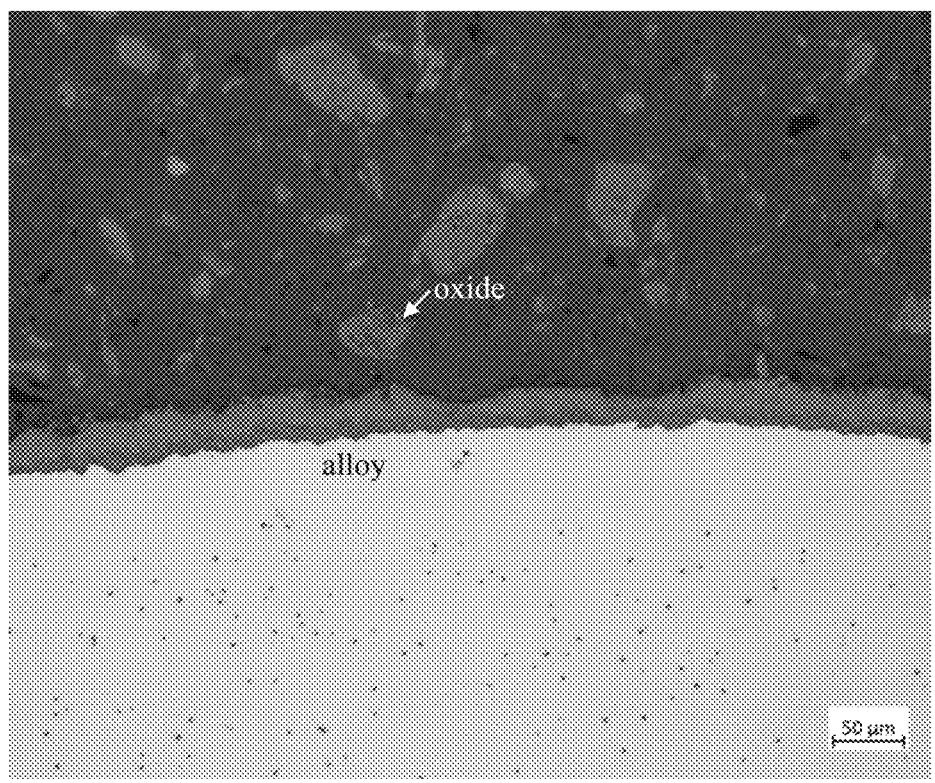
FIG. 3A is an optical micrographic image of a sample of Example 1 after exposure at 1600° F. (871° C.) for 1000 hours showing an oxide layer at the surface of the sample.
Figure 3B:
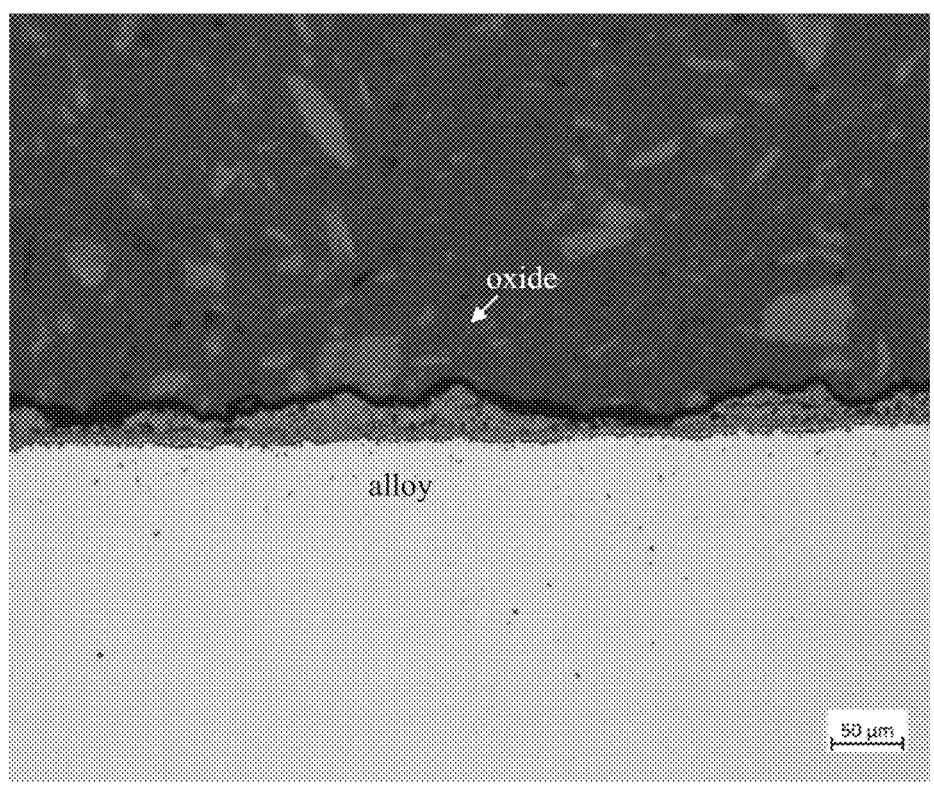
FIG. 3B is an optical micrographic image of a sample of Example 2 after exposure at 1600° F. (871° C.) for 1000 hours showing an oxide layer at the surface of the sample.
Figure 3C:
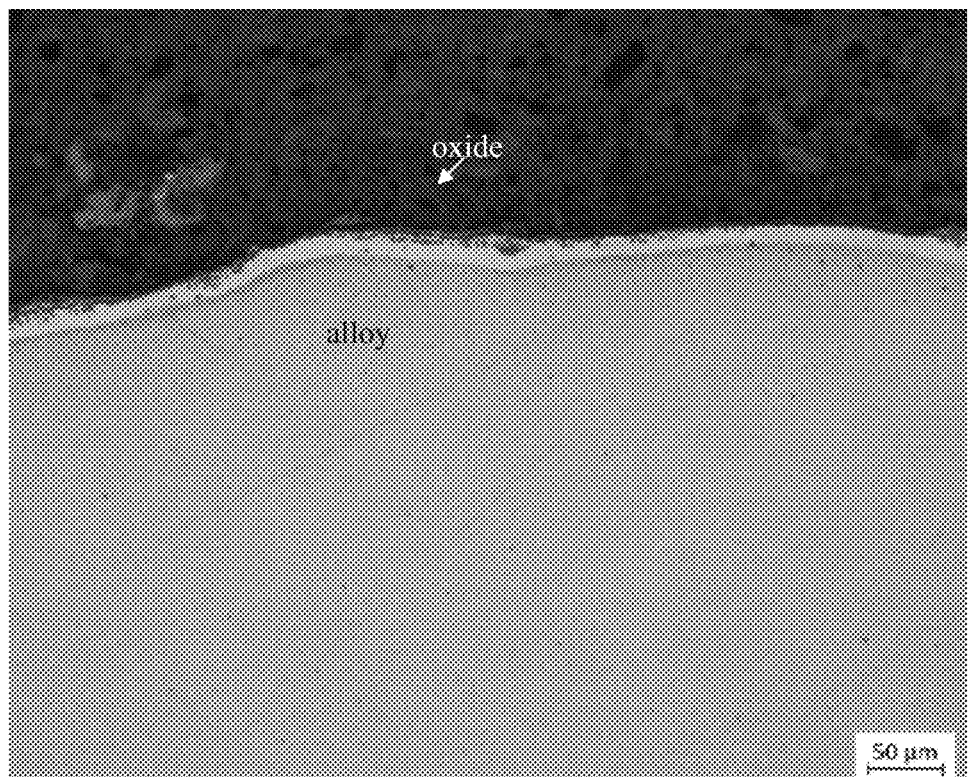
FIG. 3C is an optical micrographic image of a sample of Example 3 after exposure at 1600° F. (871° C.) for 1000 hours showing an oxide layer at the surface of the sample.
Figure 4A:
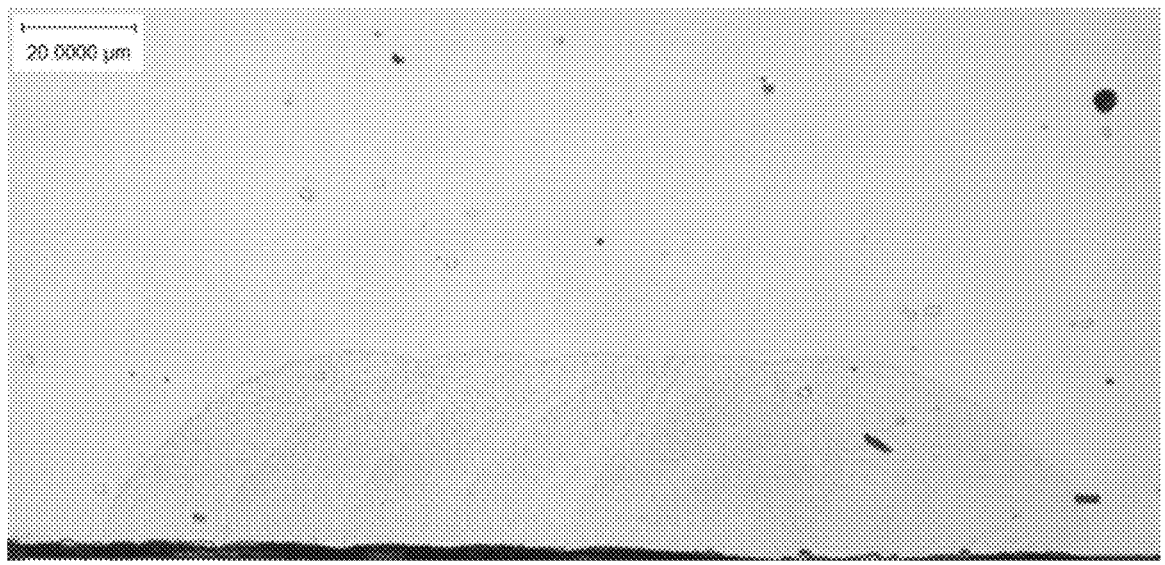
FIG. 4A is an optical micrographic image of a sample of Example 1 of the alloy according to the present invention showing a resolidified melt pool after laser melting of the metal.
Figure 4B:
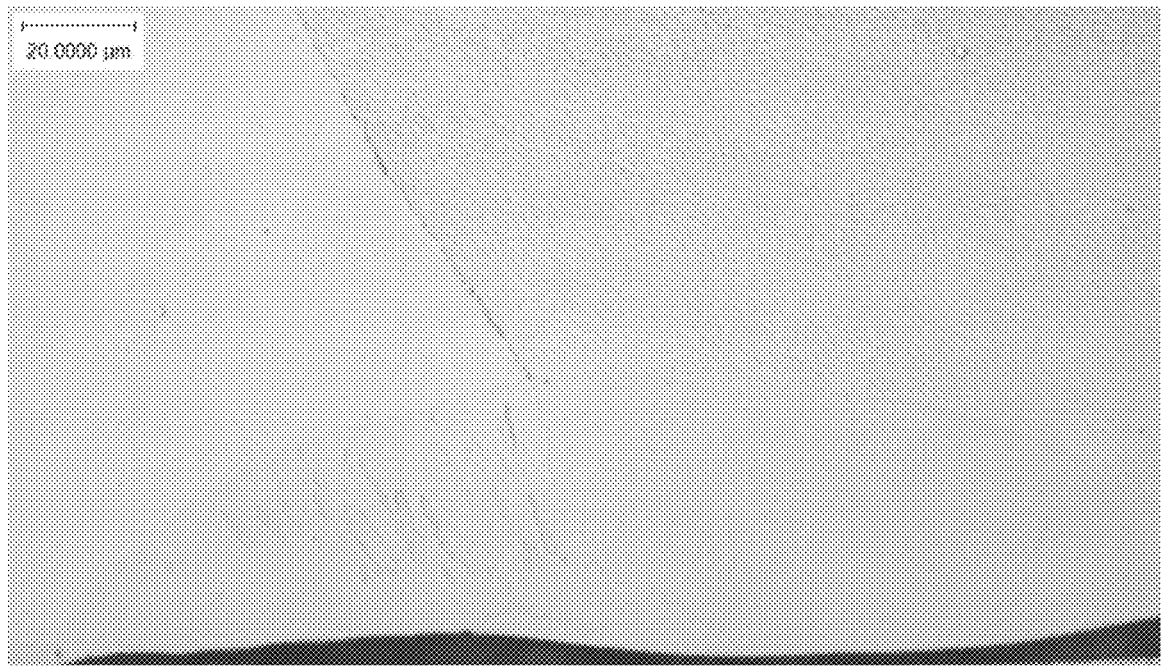
FIG. 4B is an optical micrographic image of a sample of Example 2 of the alloy according to the present invention showing a resolidified melt pool after laser melting of the metal.
Figure 4C:
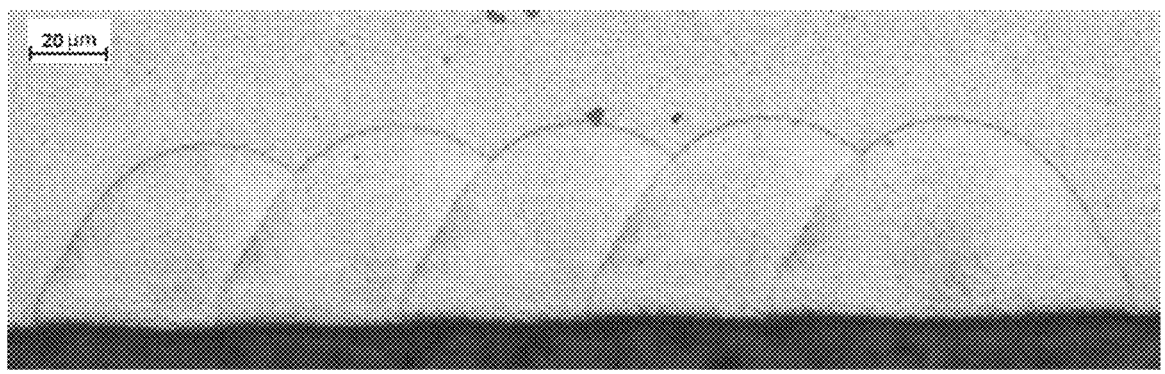
FIG. 4C is an optical micrographic image of a sample of Example 3 of the alloy according to the present invention showing a resolidified melt pool after laser melting of the metal.
Figure 4D:
FIG. 4D is an optical micrographic image of a sample of the CM247LC alloy showing a resolidified melt pool after laser melting of the metal.
Figure 5A:
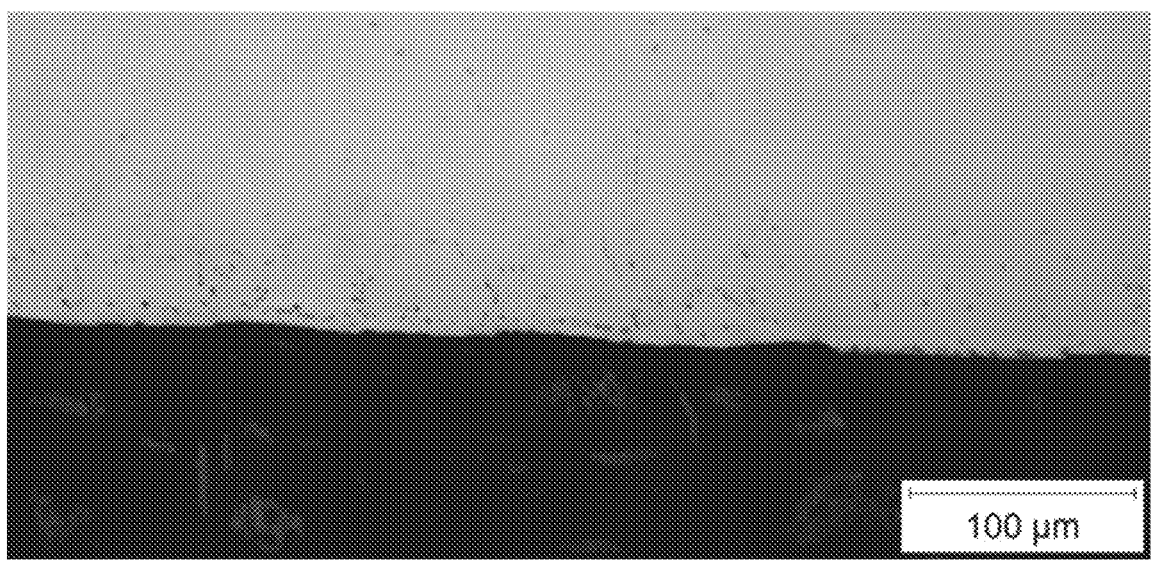
FIG. 5A is an optical micrographic image of a sample of Example 1 of the alloy according to this invention after laser melting and an aging heat treatment.
Figure 5B:
FIG. 5B is an optical micrographic image of a sample of Example 2 of the alloy according to this invention after laser melting and an aging heat treatment.
Figure 5C:
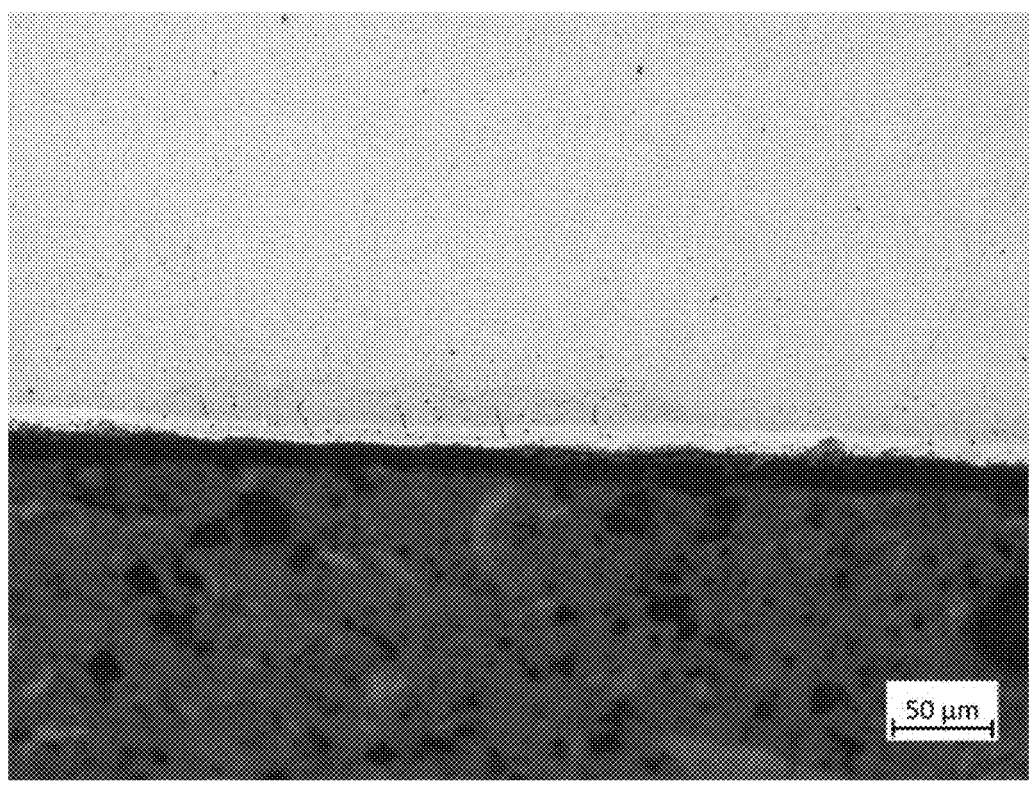
FIG. 5C is an optical micrographic image of a sample of Example 3 of the alloy according to this invention after laser melting and an aging heat treatment.
Figure 5D:
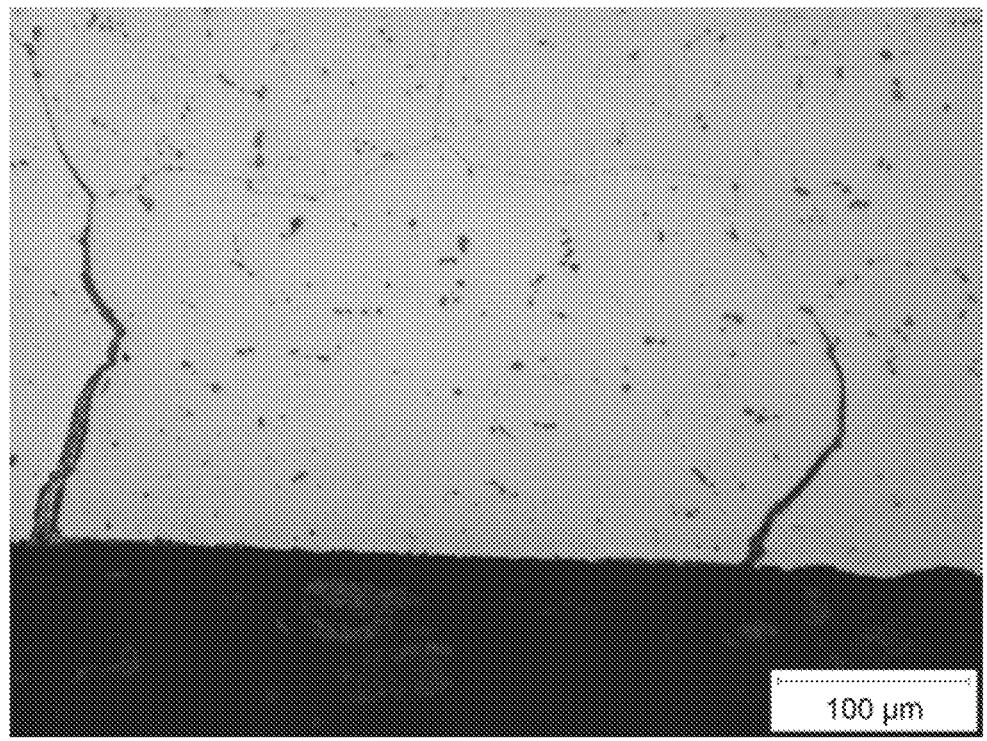
FIG. 5D is an optical micrographic image of a sample of the CM247LC alloy after laser melting and an aging heat treatment.

Shown in FIGS. 3A-3C are optical images of specimens of Examples 1-3 after being solution treated, aged, and then heated for 1000h at 1600° F. (871° C.). It can be seen that a continuous external oxide layer forms on the alloy surface. All three of the examples are microstructurally stable without formation of detrimental phases during exposure.

FIGS. 4A-4D show the melt pool structures in the alloy specimens after a bead-on-plate test (the external surface is facing downward in the figure). The sample of CM247LC (FIG. 4D) has cracks in the melt pool while the Examples 1-3 (FIGS. 4A, 4B, and 4C, respectively) are free of cracks with all the power density and hatch-spacing combinations tested.

Additional heat treatment was carried out on the examples after the bead-on-plate test. The heat treatment consisted of heating the examples at 1975° F. (1079° C.) for 4 hours, cooling in air, and then heating at 1600° F. (871° C.) for 20 hours, followed by cooling in air. In this procedure, a laser is used to produce a weld-bead track on a metal plate. The results are shown in FIGS. 5A-5D. The aging heat treatment eliminated the dendritic structure in the as-built condition and made it difficult to discern the melt pool location. Compared to alloy CM247LC (FIG. 5D), which showed strain-age cracking, the three examples of the alloy of the present invention (FIGS. 5A, 5B, and 5C) show no sign of cracks and which demonstrates that they are highly resistant to strain-age cracking.

Figure 6A:
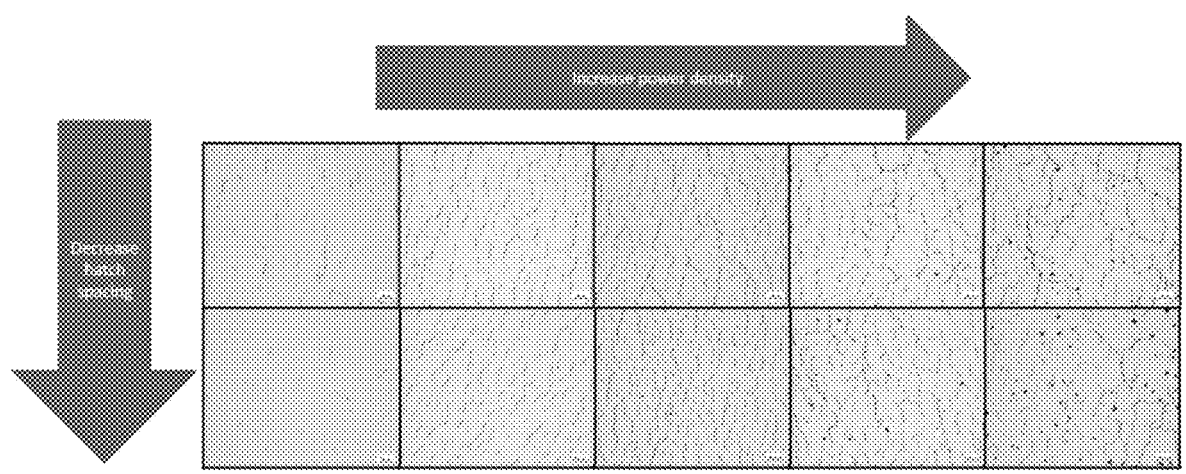
FIG. 6A is a series of optical micrographic images of samples from builds of CM247LC alloy powder prepared with a laser powder bed fusion system at various laser power densities and various hatch spacings.
Figure 6B:
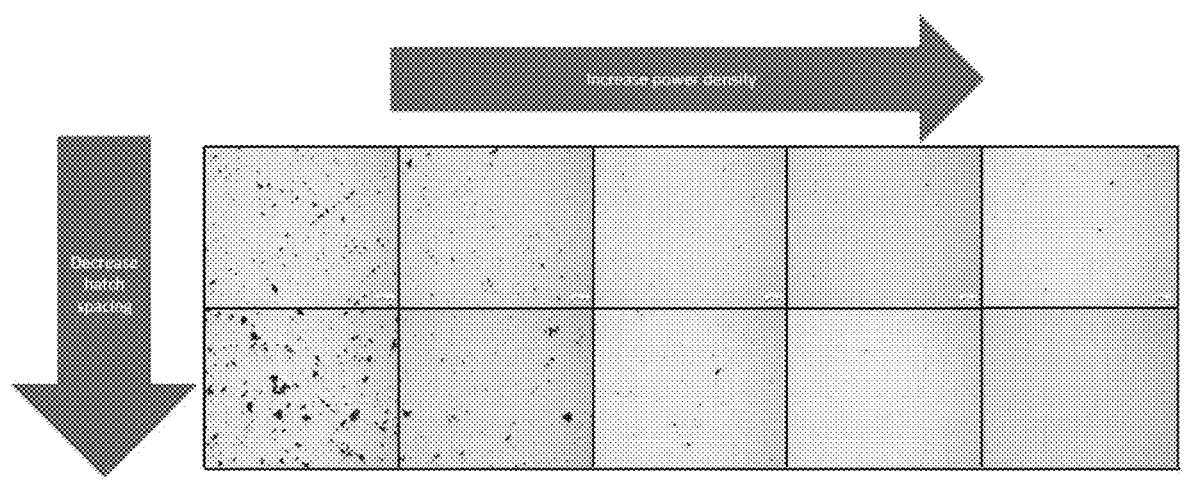
FIG. 6B is a series of optical micrographic images of samples from builds of alloy powder made from Example 1 and prepared with the laser powder bed fusion system at various laser power densities and various hatch spacings.
Figure 6C:
FIG. 6C is a series of optical micrographic images of samples from builds of alloy powder made from Example 2 and prepared with the laser powder bed fusion system at various laser power densities and various hatch spacings.

Based on the results from the bead-on-plate test, batches of gas-atomized powder of the example alloys and the CM247LC alloy were produced. Additively manufactured samples were printed with a laser powder bed fusion system. The processing parameters (including laser power, scan speed, hatch spacing, etc.) were varied to provide a plurality of build samples. The as-built microstructures of the several samples are shown in FIGS. 6A to 6B. Each image was taken at 50× magnification. Thus, each image corresponds to a field of view about 2.6 mm by 2.2 mm. In FIGS. 6A-6C, the laser power density increases from left to right while the hatch spacing decreases from top to bottom. FIG. 6A shows the as-built microstructures of the CM247LC samples have severe cracking issues for most test conditions. FIG. 6B, shows the as-built microstructures of Example 1 and FIG. 6C shows the as-built microstructures of Example 2. FIGS. 6B and 6C show good crack resistance and demonstrate that the Examples 1 and 2 provide a large processing window in which to achieve good build quality with very low porosity and very low crack density.

Figure 7A:
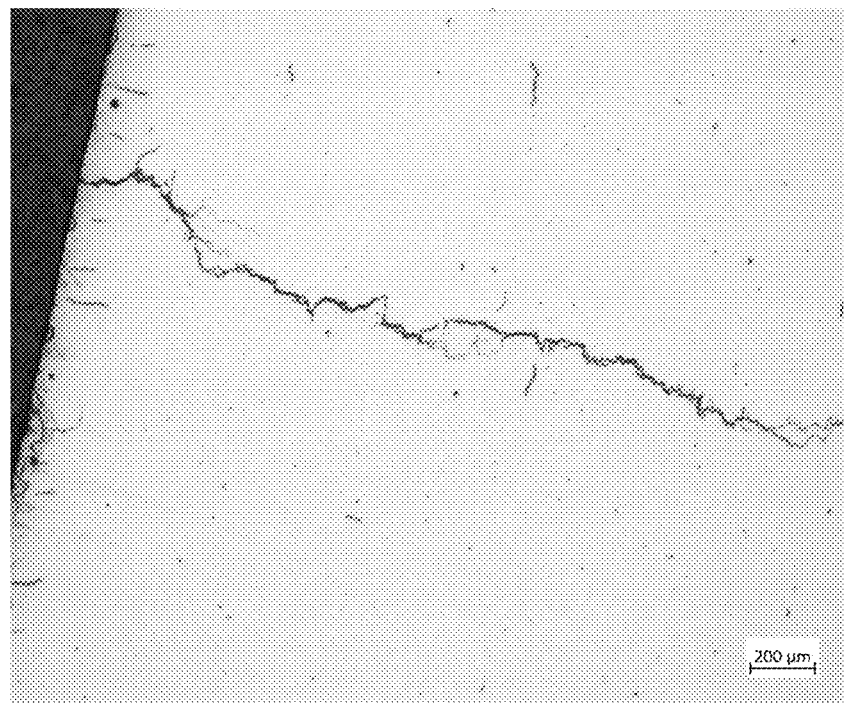
FIG. 7A is an optical micrographic image of one sample of the as-built CM247LC alloy after solution and aging heat treatments.
Figure 7B:
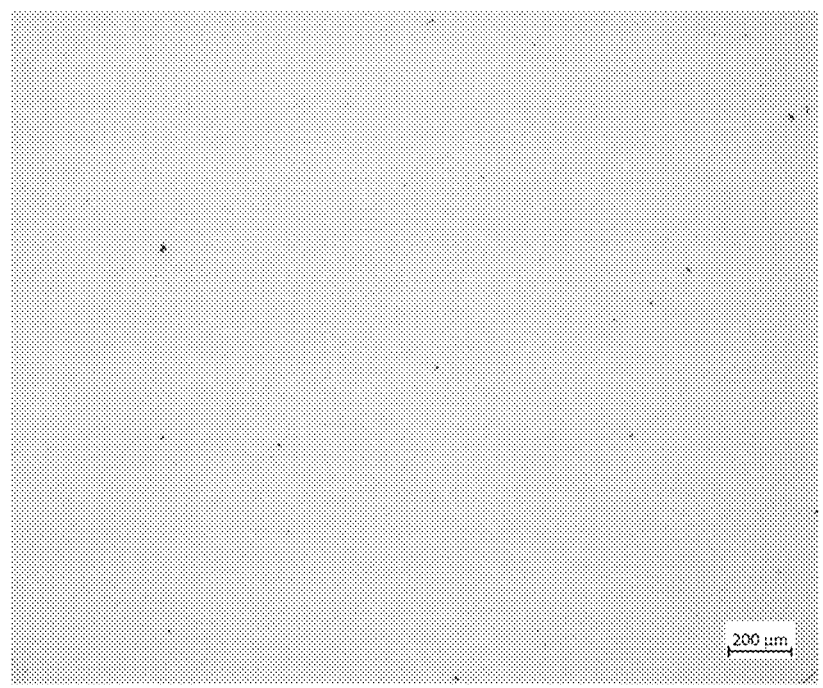
FIG. 7B is an optical micrographic image of one sample of the as-built alloy of Example 1 after solution and aging heat treatments.
Figure 7C:
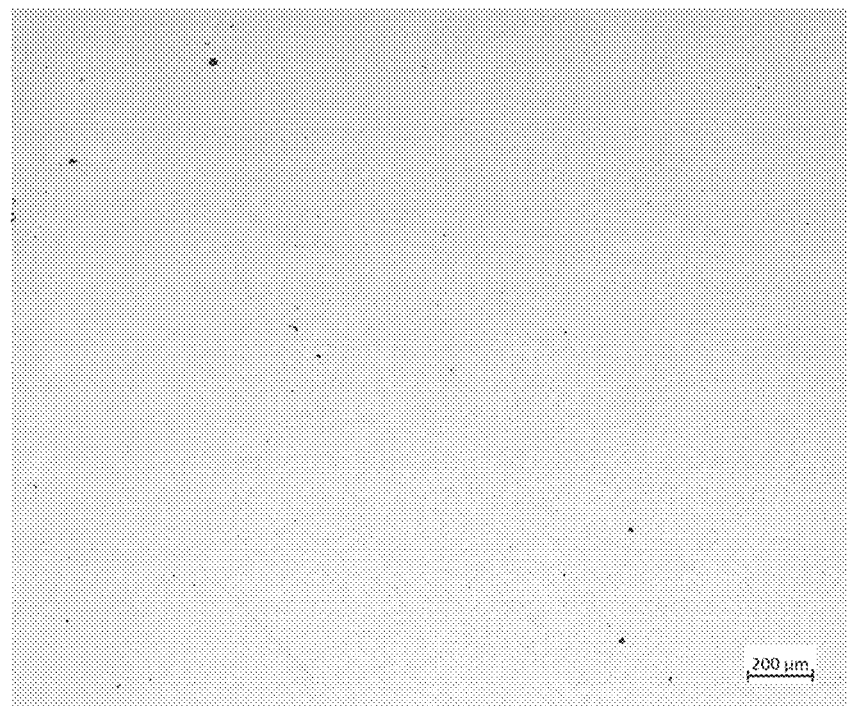
FIG. 7C is an optical micrographic image of one sample of the as-built alloy of Example 2 after solution and aging heat treatments.

Samples with the lowest crack density and porosity were selected from each alloy and further processed with a post-build heat treatment consisting of solution and aging heat treatments. The samples were solution treated at 2250° F. (1232° C.) for one hour, quenched in water, aged at 1975° F. (1079° C.) for 4 hours, air cooled, aged at 1600° F. (871° C.) for 20 hours, and then cooled in air. FIG. 7A shows a substantial number of thin hairline cracks in the CM247LC material after aging, while FIG. 7B and FIG. 7C show that the material of Example 1 and Example 2 remain crack free after post build heat treatment.

Additional examples were prepared by Argon gas atomization having the weight percent compositions shown in Table 3 below. The batches of alloy powder were consolidated and then processed to provide standard specimens for tensile and stress rupture testing.

TABLE 3

| Ex. | Al | Co | Cr | Mo | Nb | Ta | W | C | B | Zr | Ni |
|---|---|---|---|---|---|---|---|---|---|---|---|
| 4 | 4.0 | 5.2 | 9.9 | 3.0 | 4.0 | 7.9 | 1.2 | 0.077 | 0.015 | 0.013 | Bal |
| 5 | 4.1 | 1.6 | 9.7 | 3.0 | 3.1 | 8.9 | 3.8 | 0.038 | 0.007 | 0.010 | Bal |

Figure 8:
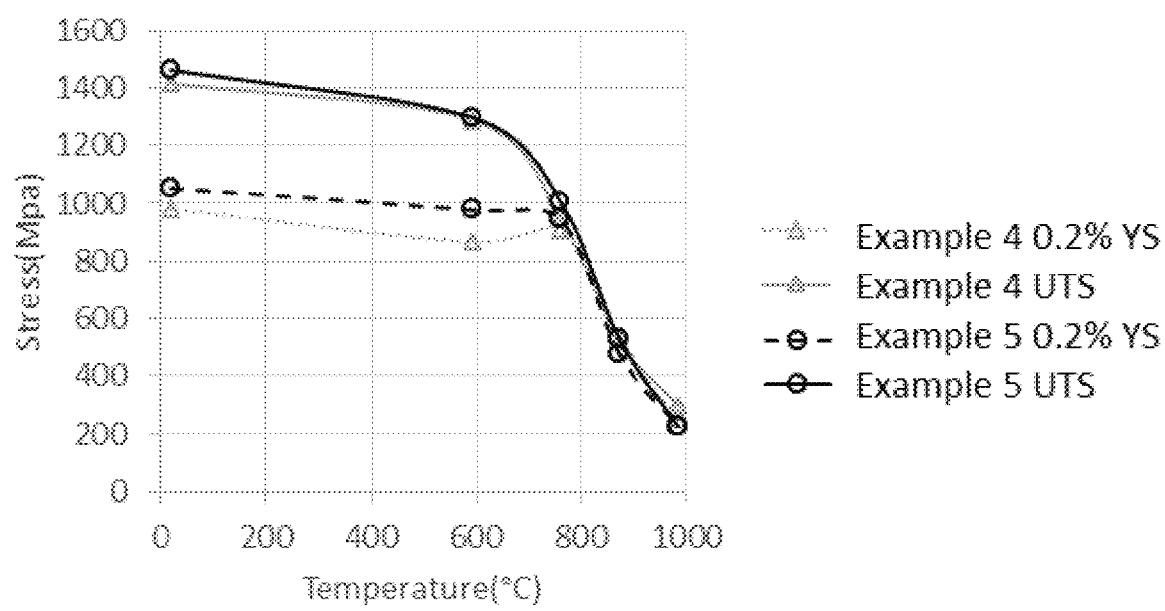
FIG. 8 shows graphs of the tensile and yield strengths of Example 4 and Example 5 as a function of temperature in the range from room temperature to 1800° F. (982° C.)

Tensile testing was performed on the specimens of Examples 4 and 5 at several temperatures in the range from room temperature up to 1800° F. (982° C.). The results of the tensile testing are set forth in Table 4 below including the test temperature in degrees Celsius and the ultimate tensile strength and the yield strength in MPa. The results are also plotted in FIG. 8.

TABLE 4

| Temp. | Example 4 | | Example 5 | |
|---|---|---|---|---|
| (° C.) | UTS(MPa) | YS(MPa) | UTS(MPa) | YS(MPa) |
| 21 | 1413.4 | 979.1 | 1461.7 | 1054.9 |
| 593 | 1285.9 | 865.3 | 1296.9 | 978.4 |
| 760 | 946.7 | 903.9 | 1008.3 | 947.3 |
| 871 | 523.3 | 522.6 | 530.6 | 477.8 |
| 982 | 299.9 | 255.8 | 228.9 | — |

Figure 9:
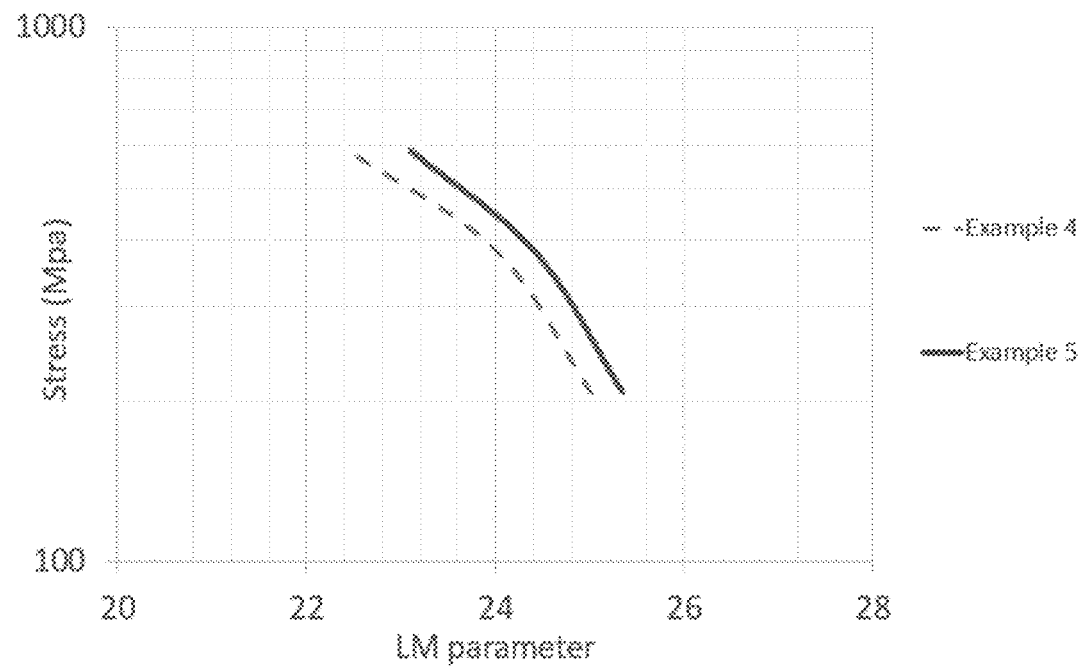
FIG. 9 shows graphs representing the stress rupture lives of Example 4 and Example 5 based on the Larson-Miller parameter.

Stress rupture testing was performed on the specimens of Examples 4 and 5 at several temperatures in the range from 1300° F. to 1700° F. (704° C. to 927° C.). The results of the stress rupture testing are plotted in FIG. 9 based on the Larson-Miller parameter.

Cyclic oxidation testing was performed on specimens of Examples 4 and 5. The cyclic oxidation test was performed at 1800° F. (982° C.), with each cycle made up of 0.25 hr ramping, a 1-hour hold at 1800° F. (982° C.), and 0.25 hr forced air cool. The results of the cyclic oxidation testing are set forth in Table 5 below including the number of cycles and the specific weight change in g/cm$^2$.

TABLE 5

| | Specific Weight Change | |
|---|---|---|
| Cycles | Example 4 | Example 5 |
| 0 | 0 | 0 |
| 10 | $3.813(10^{-5})$ | $3.472(10^{-4})$ |
| 20 | $2.288(10^{-4})$ | $4.244(10^{-4})$ |
| 50 | $7.626(10^{-5})$ | $7.716(10^{-4})$ |
| 100 | $3.051(10^{-4})$ | $8.488(10^{-4})$ |
| 150 | $4.004(10^{-4})$ | $1.138(10^{-3})$ |
| 200 | $5.148(10^{-4})$ | $1.119(10^{-3})$ |
| 300 | $4.004(10^{-4})$ | $1.196(10^{-3})$ |
| 400 | $2.097(10^{-4})$ | $1.389(10^{-3})$ |
| 600 | $1.716(10^{-4})$ | $1.447(10^{-3})$ |
| 800 | $4.004(10^{-4})$ | $1.678(10^{-3})$ |
| 1000 | $3.813(10^{-5})$ | $3.472(10^{-4})$ |

Figure 10:
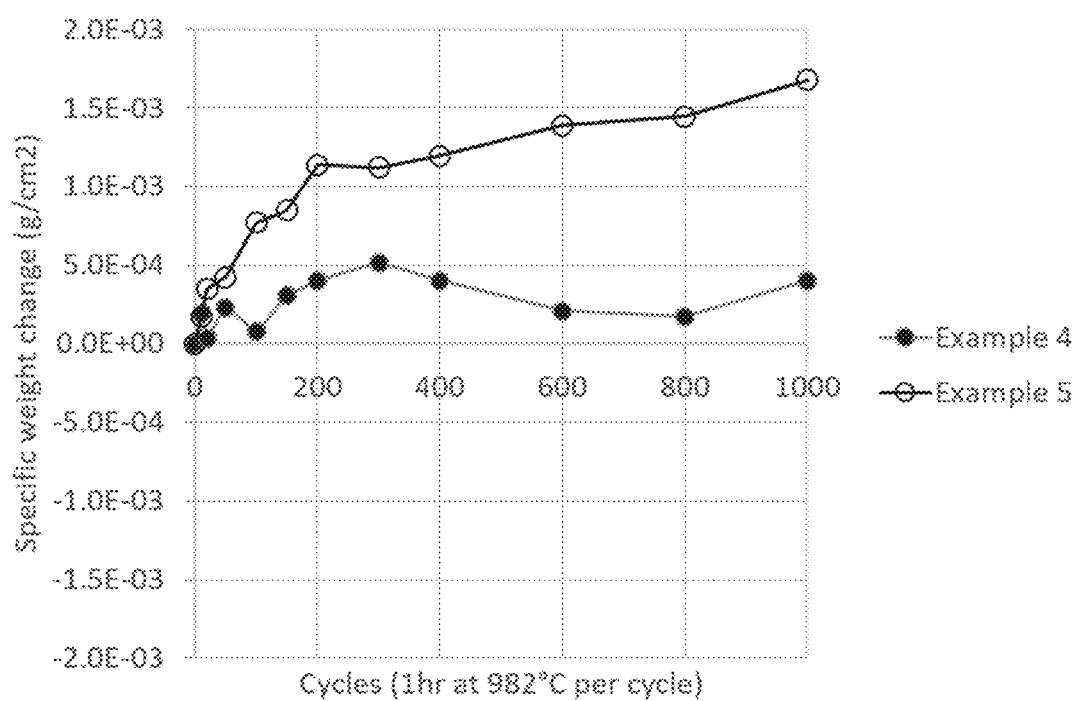
FIG. 10 shows graphs of the results of the 1800° F. (982° C.) cyclic oxidation testing of Example 4 and Example 5.

FIG. 10 shows graphs of the data presented in Table 4. Both Example 4 and Example 5 appear to be oxidation resistant since they did not experience weight loss up to 1000 cycles.

The terms and expressions which are employed in this specification are used as terms of description and not of limitation. There is no intention in the use of such terms and expressions of excluding any equivalents of the features shown and described or portions thereof. It is recognized that various modifications are possible within the invention described and claimed herein.

The invention claimed is:

1. A high γ' volume fraction Ni-base alloy for laser and electron beam additive manufacturing processes, said alloy consisting essentially of, in weight percent,

| | |
|---|---|
| C | 0-0.1 |
| Mn | 0.5 max. |
| Si | 0-0.03 |
| Cr | 8-11 |
| Fe | 1 max. |
| Mo | 2-5 |
| W | 0.5-6 |
| Co | 4-6 |
| Al | 3-5 |
| Nb | 3.86-5 |
| Ta | 7.5-9.5 |
| Hf | 0-1.5 |
| Zr | 0-0.1 |
| Ru | 0-1 |
| B | 0-0.03 | and the balance of the alloy is nickel and impurities found in commercial grades of Ni-base superalloys intended for the same use and service, said impurities including not more than 0.03% P, and not more than 0.01% each of S, O, and N; wherein % W+% Mo+% Ru+% Re≤10;

10.5≤% Nb+% Ta≤14.5;

wherein the alloy excludes titanium and rhenium; and wherein the alloy contains at least 50% nickel.

2. The alloy claimed in claim 1 which contains at least about 9% Cr.

3. The alloy claimed in claim 1 which contains at least about 3.5% W.

4. The alloy claimed in claim 3 which contains not more than about 4.5% W.

5. The alloy claimed in claim 1 which contains not more than about 4% Nb.

6. An article of manufacture made from consolidated alloy powder produced from the alloy claimed in claim 1, wherein said article consists essentially of a γ phase matrix containing a γ′ strengthening phase and the γ′ phase is present in a volume fraction greater than 35%.

7. The article claimed in claim 6 wherein the volume fraction of the γ′ phase is greater than 50%.

8. The article claimed in claim 6 which is further characterized by having a lattice misfit parameter (δ) that is greater than about −0.1%, wherein the lattice misfit parameter is defined as:

$$\delta = \frac{2 \times (\alpha_{\gamma'} - \alpha_{\gamma})}{\alpha_{\gamma'} + \alpha_{\gamma}}$$

and wherein $\alpha_{\gamma'}$ is the lattice constant for the γ′ precipitate and $\alpha_{\gamma}$ is the lattice constant for the γ phase matrix material.

9. A high γ′ volume fraction Ni-base alloy for laser and electron beam additive manufacturing processes, said alloy consisting essentially of, in weight percent,

| | |
|---|---|
| C | 0-0.1 |
| Mn | 0.5 max. |
| Si | 0-0.03 |
| Cr | 4-11 |
| Fe | 1 max. |
| Mo | 0-5 |
| W | 0.5-8 |
| Co | 0-6 |
| Al | 3-3.95 |
| Nb | 3.86-5 |
| Ta | 7.5-9.5 |
| Hf | 0-1.5 |
| Zr | 0-0.1 |
| Re | 0-1 |
| Ru | 0-1 |
| B | 0-0.03 | and the balance of the alloy is nickel and impurities found in commercial grades of Ni-base superalloys intended for the same use and service, said impurities including not more than 0.03% P, and not more than 0.01% each of S, O, and N; wherein % W+% Mo+% Ru+% Re≤10;

10.5≤% Nb+% Ta≤14.5;

wherein the alloy excludes titanium; and
wherein the alloy contains at least 50% nickel.

10. The alloy claimed in claim 9 wherein rhenium is excluded.

* * * * *